March 2, 1954     W. A. WALDIE     2,671,063
VINYL RESIN-ALKYD WRINKLE COMPOSITION
Filed Dec. 8, 1950
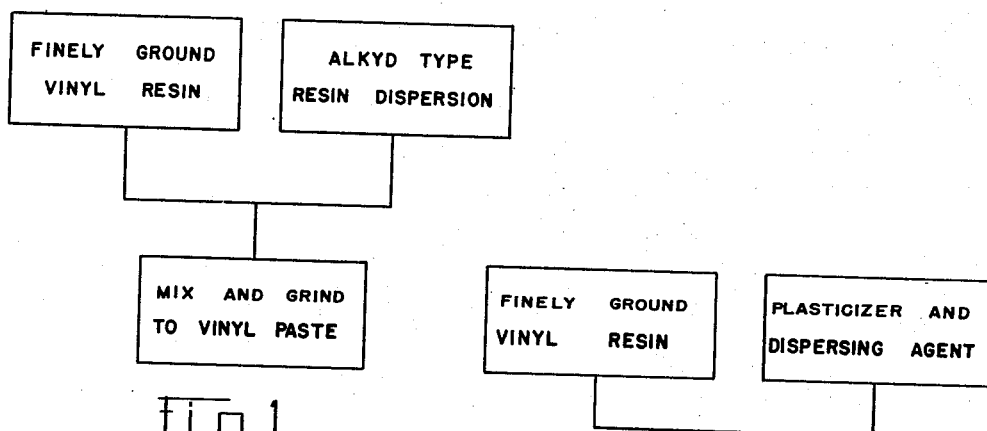
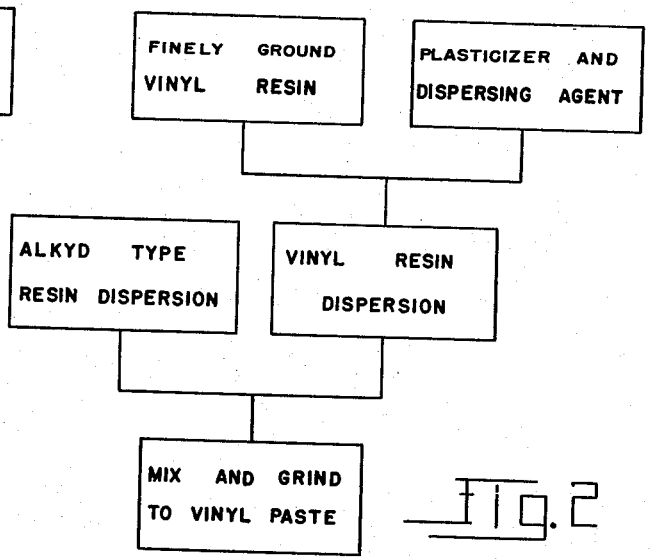
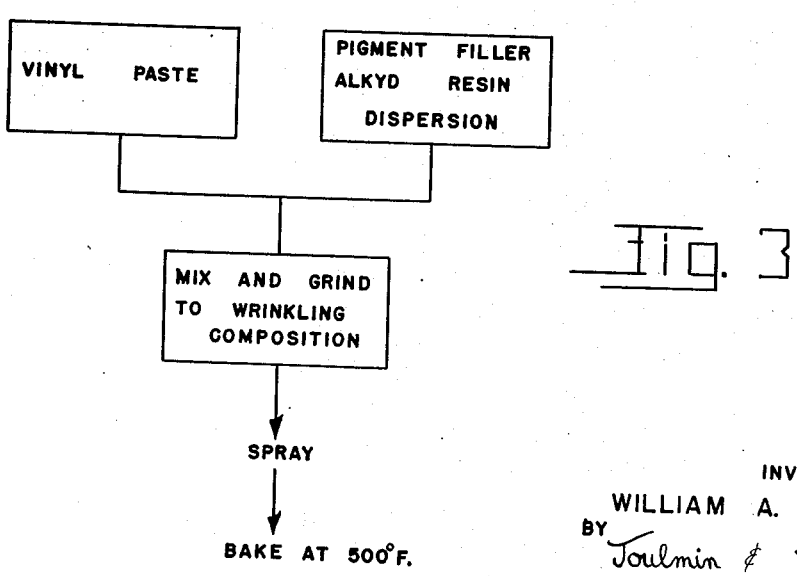
INVENTOR
WILLIAM A. WALDIE
BY Toulmin & Toulmin
ATTORNEYS Patented Mar. 2, 1954

2,671,063

UNITED STATES PATENT OFFICE 2,671,063

VINYL RESIN-ALKYD WRINKLE COMPOSITION

William A. Waldie, Dayton, Ohio, assignor to New Wrinkle, Inc., Dayton, Ohio, a corporation of Delaware Application December 8, 1950, Serial No. 199,788

18 Claims. (Cl. 260—22)

This invention relates to wrinkle coating compositions and more particularly to a wrinkle coating composition containing vinyl resins.

Vinyl resins are of several distinct basic types, known as the acetates, chlorides, chlor-acetates, butyrates, and each of these may be modified by the inclusion of acid components, such as maleic anhydride. The properties of each of these vinyl resins vary as to solubility, viscosity in solution, the miscibility with oils, varnishes, other resins and alkyds, this latter factor being particularly pertinent in the formation of wrinkle coatings. As a general rule even a low concentration of a vinyl resin in a solvent produces a viscous solution which can only be applied to surfaces to be coated with a doctor blade or a roll coater.

While the solvent utilized in the solution has a definite bearing on the viscosity of such a vinyl resin solution even low viscosity solutions tend to feather when applied by spraying. Accordingly such vinyl resins have not been considered generally satisfactory for the formation of wrinkle coatings and have been considered particularly unsatisfactory where it is desired to spray the wrinkle coating.

In my co-pending application, Serial No. 192,863, filed October 30, 1950, I have set forth a method of solving the above problem while using solutions of vinyl resins.

It is a primary object of this invention to provide a process for producing a wrinkle coating composition having a vinyl resin therein without the necessity of using a vinyl resin solution.

It is a further object of this invention to provide a wrinkle coating composition having a vinyl resin therein and which can be readily sprayed.

It is a particular object of this invention to provide a wrinkle coating composition having a vinyl resin contained therein and which results in a hard durable film on baking thereof.

It is an important object of this invention to provide a vinyl resin paste which may be used in the production of a wrinkle coating composition.

It is another object of this invention to provide a wrinkle coating composition having a vinyl resin contained therein and which produces a film of fine uniform texture.

It is yet another object of this invention to provide a pigmented wrinkle coating composition having vinyl resin contained therein and which does not discolor when subjected to baking temperatures.

It is still another object of this invention to provide a wrinkle coating composition having a vinyl resin contained therein and which has substantially no gloss when baked.

It is another important object of this invention to provide a wrinkle coating composition having a vinyl resin contained therein which may be baked to a hard film in a short period of time.

It is a further object of this invention to provide a wrinkle coating composition having a vinyl resin contained therein which bakes to a scratch proof film.

It is also an object of this invention to provide a wrinkle coating composition having a vinyl resin contained therein which forms a non-thermoplastic wrinkle film upon baking.

These and other objects are accomplished by grinding a finely divided vinyl resin with an alkyd type resin solution, having the property of wrinkling with drier, to form a vinyl paste, and mixing this paste with coloring material, drier, solvent and further alkyd resin as required. The composition resulting from such a mixture may be readily sprayed and baked.

I have found that finely ground vinyl chloride polymers and copolymers are particularly suitable for the formation of a paste with the alkyd resin mix. It is preferred that the size of the particles of polyvinyl chloride resin when added as a powder be in the range of about 1 to 30 microns in diameter with a mean diameter of 8 to 10 microns. In some instances it may be desirable to first disperse the polyvinyl chloride resin in a suitable hydrocarbon and add a plasticizer thereto to facilitate the mixing of the resin with the alkyd resin solution.

The grinding to form the vinyl paste must be carefully carried out to avoid undue heat which would swell the vinyl resin and unduly increase the viscosity of the resulting paste. Polyvinyl chloride resins I have found are particularly suitable in this respect, since the small amount of heat which may be generated does not deleteriously affect the resulting paste.

The grinding operation of the vinyl resin with the alkyd resin may be carried out on suitable apparatus known to the art such as pebble mills, ball mills, or roll mills, and the particular apparatus used, it may be noted, forms no part of the present invention.

It should also be noted the polyvinyl resin when ground into the paste form functions as an inert pigment therein and the necessity for utilizing the usual pigmentation by means of talc, asbestine, etc. is substantially eliminated. When the final composition is sprayed to form a film the inert polyvinyl resin upon subsequent baking of the film is melted by the heat and becomes an integral part of the film, thus modifying the characteristics of the alkyd resin and producing a fine wrinkle pattern of hard, scratch proof structure.

The texture of the resultant film is dependent to a degree upon the ratio of the amount of polyvinyl resin used to the amount of alkyd resin. This ratio calculated on a weight basis of the solid content of the two resins may vary between 1:1 and 1:10, although a content of polyvinyl to alkyd of about 1:5 is preferred. If an excessive amount of vinyl resin is used the texture of the resulting film becomes almost microscopic and the film itself presents a dull appearance.

In the accompanying drawing a flow sheet is presented which illustrates the various steps of the preferred methods of the process for making the coating composition of my invention.

The following examples taken in connection with the accompanying flow sheet may be considered as exemplary of the compositions and methods particularly employed in connection with the present invention.

*Example I*

A brown pigmented vinyl-alkyd resin wrinkling coating was prepared as follows:

(a) A cooked oil extended modified alkyd resin was first prepared containing parts by weight as follows:

Alkyd resin—1: | Per cent
---|---
Glycerine | 12.28
Phthalic anhydride | 19.93
Maleic anhydride | 1.15
Linseed oil acids | 16.94
Rosin | 23.12
Tung oil | 26.58
Total | 100

This resin is dissolved in a thinner such as xylol to form alkyd resin solution—1. This solution contains approximately 60% resin and 40% xylol by weight.

(b) A vinyl paste was then prepared by grinding together the following parts by weight:

Vinyl paste—1: | 
---|---
Commercial polyvinyl chloride resin (1 to 30 microns in diameter) | 4
Alkyd resin solution—1 | 8
Total | 12

The above paste is stable and may be stored for a time before using.

(c) A paste for the pigmentation of the wrinkling composition to be produced was then prepared by mixing in parts by weight the following:

Brown paste—1: | 
---|---
Burnt umber | 5.0
Titanium oxide | 2.5
Calcium carbonate (Multifex) | 3.5
Dicalcium aluminate } Celite 266 | 4.0
Dicalcium silicate | 
Alkyd resin solution—1 | 28
Total | 43

(d) A brown pigmented vinyl-alkyd resin wrinkle composition was then formed by mixing while agitating the following in parts by weight:

| | 
---|---
Brown paste—1 | 90
Alkyd resin solution—1 | 123
Vinyl paste—1 | 54
Cobalt naphthenate 6% | 3
Butanol | 15
Toluol | 75
Total | 360

The weight ratio of vinyl resin to alkyd resin in the above mix is 1:7.25.

The wrinkle composition so formed when sprayed on a metal panel and baked for 30 minutes at 300° F. yielded a uniform fine wrinkle pattern.

It should be noted that the use of polyvinyl chloride in the above formulation results in a material reduction in baking time over that normally required, that is, 45 minutes at 300° F. as contrasted to 30 minutes at 300° F. in the present instance.

*Example II*

A blue pigmented vinyl-alkyd resin composition was prepared as follows:

(a) Alkyd resin solution—2.

A solution of alkyd resin modified with tung oil having the following characteristics was first prepared:

| | 
---|---
Non-volatiles | 49–51%
Solvent—coal tar and petroleum solvents. | 
Viscosity | U—W
Acid | 12–18
Weight per gallon | 7–7 lbs.

(b) A vinyl paste was then prepared by grinding polyvinyl chloride as a fine white powder into the solution of (a) above, in parts by weight as follows:

Vinyl paste—2: | 
---|---
Alkyd resin solution—2 | 8
Polyvinyl chloride powder 1–30 microns diameter | 4
Total | 12

A suitable polyvinyl chloride for this purpose is manufactured by The B. F. Goodrich Chemical Co., Cleveland, Ohio, under the trade designation Geon Resin 121.

(c) A blue pigmented paste was prepared by mixing together the following components in parts by weight:

Blue paste—1: | 
---|---
Magnesium silicate | 4
Cobalt blue | 4
Alkyd resin solution—2 | 8
High flash naphtha | 2
Total | 18

The blue pigmented vinyl-alkyd resin wrinkle composition was then achieved by mixing while agitating, in parts by weight:

| | 
---|---
Blue paste—1 | 90
Vinyl paste—2 | 60
Alkyd resin solution—2 | 160
Cobalt naphthenate | 3
Toluol | 57
Total | 370

The above composition when baked and sprayed on a metal panel gave a fine wrinkle texture.

The ratio of vinyl resin to alkyd resin by weight in the above composition is 1:6.

Example III

Another blue pigmented vinyl-alkyd resin wrinkling composition was prepared as follows:

(a) Vinyl paste—3:

| | Parts |
|---|---|
| Vinyl chloride, 95% }<br>Vinyl acetate, 5% } | 4 |
| Alkyd resin solution—2 | 8 |
| Total | 12 |

The copolymer resin containing 95% vinyl chloride and 5% vinyl acetate may be added to the alkyd resin solution either in fine powder form or as a dispersion in a hydrocarbon and where desirable a plasticizer may also be added to the resin in a manner well known to the art. I prefer, however, to add the copolymer as a finely ground powder.

(b) The blue vinyl-alkyd wrinkle resin composition was then made up by mixing together in parts by weight the following components:

| | |
|---|---|
| Blue paste—1 | 90 |
| Vinyl paste—3 | 60 |
| Cobalt naphthenate 6% | 3 |
| Alkyd resin solution—2 | 160 |
| Toluol | 57 |
| Total | 370 |

The ratio of vinyl resin to alkyd resin by weight in the above composition is 1:6.

The wrinkle composition sprayed well and when baked produced a hard scratch-proof film in 30 minutes at 300° F. This film, as in each of the other examples given, was non-thermoplastic.

I have thus described several specific examples for the production of a wrinkling resin composition utilizing a vinyl resin paste.

It will be apparent to those skilled in the art that my invention is not limited to the specific colored wrinkle finishes as set forth herein, but that substantially any color of wrinkle finish may be produced by my novel process.

It will also be understood by those skilled in the art that other modifications of my invention may be accomplished by proper selection of polyvinyl resins having certain properties, particularly the finely ground feature of the resin, which permits complete and uniform dispersion throughout the vinyl paste.

It will further be understood that while there have been described herein certain specific embodiments of my invention, it is not intended thereby to have it limited to or circumscribed by the specific details given, in view of the fact that this invention is susceptible to various modifications and changes which come within the spirit of the invention and the scope of the appended claims.

I claim:

1. A wrinkling finish composition comprising a finely divided vinyl resin selected from the group consisting of polyvinyl chloride and vinyl chloride-vinyl acetate copolymers, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, and solvent, the weight ratio of the selected vinyl resin to the wrinkling alkyd resin being from 1:1 to 1:10.

2. A wrinkling finish composition comprising finely divided polyvinyl chloride resin, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, and solvent, the weight ratio of polyvinyl chloride resin to wrinkling alkyd resin being from 1:1 to 1:10.

3. A wrinkling finish composition comprising a finely divided resinous copolymer of vinyl chloride and vinyl acetate, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, and solvent, the weight ratio of the resinous copolymer to the wrinkling alkyd resin being from 1:1 to 1:10.

4. A wrinkling finish composition comprising pigment, a finely divided vinyl resin selected from the group consisting of polyvinyl chloride and copolymers of vinyl chloride and vinyl acetate, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, and solvent, the weight ratio of the selected vinyl resin to the wrinkling alkyd resin being from 1:1 to 1:10.

5. A wrinkling finish composition comprising pigment, finely divided polyvinyl chloride, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, a metal drier, and solvent, the weight ratio of polyvinyl chloride resin to wrinkling alkyd resin being about 1:7.25.

6. A wrinkling finish composition comprising pigment, finely divided polyvinyl chloride resin, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, a metal drier, and solvent, the weight ratio of polyvinyl chloride to the wrinkling alkyd resin being about 1:6.

7. A wrinkling finish composition comprising pigment, a finely divided resinous copolymer of vinyl chloride and vinyl acetate, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, a metal drier, and solvent, the weight ratio of the resinous copolymer to the wrinkling alkyd resin being about 1:6.

8. The method of making a wrinkling finish composition which comprises the step of dispersing a finely divided vinyl resin selected from the group consisting of polyvinyl chloride and resinous copolymers of vinyl chloride and vinyl acetate in a solution of a wrinkling alkyd resin, said alkyd being obtained by cooking together, by weight, about 12.28% glycerine, about 19.93% phthalic anhydride, about 1.15% maleic anhydride, about 16.94% linseed oil acids, about 23.12% rosin and about 26.58% tung oil, the weight ratio of the selected vinyl resin to the wrinkling alkyl resin being from 1:1 to 1:10.

9. The method of making a wrinkling finish composition which comprises the step of dispersing finely divided polyvinyl chloride resin in a solution of a wrinkling alkyd resin, said alkyd being obtained by cooking together, by weight, about 12.28% glycerine, about 19.93% phthalic anhydride, about 1.15% maleic anhydride, about 16.94% linseed oil acids, about 23.12% rosin and about 26.58% tung oil, the weight ratio of the polyvinyl chloride resin to the wrinkling alkyd resin being from 1:1 to 1:10.

10. The method of making a wrinkling finish composition which comprises the step of dispersing a finely divided resinous copolymer of vinyl chloride and vinyl acetate in a solution of a wrinkling alkyd resin, said alkyd being obtained by cooking together, by weight, about 12.28% glycerine, about 19.93% phthalic anhydride, about 1.15% maleic anhydride, about 16.94% linseed oil acids, about 23.12% rosin and about 26.58% tung oil, the weight ratio of the resinous copolymer to the wrinkling alkyd resin being from 1:1 to 1:10.

11. The method of making a wrinkling finish composition which comprises forming a paste of pigment, a finely divided vinyl resin selected from the group consisting of polyvinyl chloride and resinous copolymers of vinyl chloride and vinyl acetate, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, and solvent, in which paste the weight ratio of the selected vinyl resin to the wrinkling alkyd resin is from 1:1 to 1:10, and thinning the paste with sufficient solvent to obtain a sprayable composition.

12. The method of making a wrinkling finish composition which comprises forming a paste of pigment, a finely divided polyvinyl chloride resin, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, and solvent, in which paste the weight ratio of the vinyl resin to the wrinkling alkyd resin is from 1:1 to 1:10, and thinning the paste with sufficient solvent to obtain a sprayable composition.

13. The method of making a wrinkling finish composition which comprises forming a paste of pigment, a finely divided resinous copolymer of vinyl chloride and vinyl acetate, a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, and solvent, in which paste the weight ratio of the vinyl resin to the wrinkling alkyd resin is from 1:1 to 1:10, and thinning the paste with sufficient solvent to obtain a sprayable composition.

14. The method of making a wrinkling finish composition which comprises the steps of dispersing a finely divided vinyl resin selected from the group consisting of polyvinyl chloride and resinous copolymers of vinyl chloride and vinyl acetate in a solution of a wrinkling alkyd resin, said alkyd being obtained by cooking together, by weight, about 12.28% glycerine, about 19.93% phthalic anhydride, about 1.15% maleic anhydride, about 16.94% linseed oil acids, about 23.12% rosin and about 26.58% tung oil, to obtain a paste, and mixing said paste with a paste comprising pigment, filler, and the wrinkling alkyd resin and with sufficient solvent to produce a sprayable composition, the weight ratio of the vinyl resin to the wrinkling alkyd resin in said composition being from 1:1 to 1:10.

15. The method of producing a wrinkle finish coating which comprises spraying a dispersion of pigment and a finely divided vinyl resin selected from the group consisting of polyvinyl chloride and resinous copolymers of vinyl chloride and vinyl acetate in a solution of a wrinkling alkyd resin, said alkyd being obtained by cooking together, by weight, about 12.28% glycerine, about 19.93% phthalic anhydride, about 1.15% maleic anhydride, about 16.94% linseed oil acids, about 23.12% rosin and about 26.58% tung oil, onto a base to form a film thereon, and baking said film, the weight ratio of the selected vinyl resin to wrinkling alkyd resin in the dispersion being from 1:1 to 1:10.

16. The method according to claim 15 in which the film is baked for approximately 30 minutes at about 300° F.

17. The method of producing a wrinkle finish coating which comprises spraying a dispersion of pigment and a finely divided polyvinyl chloride resin in a solution of a wrinkling alkyd resin, said alkyd being obtained by cooking together, by weight, about 12.28% glycerine, about 19.93% phthalic anhydride, about 1.15% maleic anhydride, about 16.94% linseed oil acids, about 23.12% rosin and about 26.58% tung oil, onto a base to form a film thereon, and baking said film, the weight ratio of the vinyl resin to wrinkling alkyd resin in the dispersion being from 1:1 to 1:10.

18. The method of producing a wrinkle finish coating which comprises spraying a dispersion of pigment and a finely divided resinous copolymer of vinyl chloride and vinyl acetate in a solution of a wrinkling alkyd resin, said alkyd being obtained by cooking together, by weight, about 12.28% glycerine, about 19.93% phthalic anhydride, about 1.15% maleic anhydride, about 16.94% linseed oil acids, about 23.12% rosin and about 26.58% tung oil, onto a base to form a film thereon, and baking said film, the weight ratio of the vinyl resin to wrinkling alkyd resin in the dispersion being from 1:1 to 1:10.

WILLIAM A. WALDIE.

References Cited in the file of this patent

UNITED STATES PATENTS

| Number | Name | Date |
| --- | --- | --- |
| 1,893,611 | Bradley | Jan. 10, 1933 |
| 1,954,835 | Stauffer | Apr. 17, 1934 |
| 2,254,072 | Jenkins | Aug. 26, 1941 |
| 2,431,078 | Powell et al. | Nov. 18, 1947 |
| 2,456,671 | Beynon | Dec. 21, 1948 |

OTHER REFERENCES

Gardner, Physical and Chem. Examinations of Paints, Varnishes, Lacquers and Colors, 9th ed., May 1939, page 562, Institute of Paint and Varnish Research, Washington, D. C.